J. O'NEAL AND J. F. HAEPPNER.
PISTON RING.
APPLICATION FILED JAN. 2, 1920.
1,376,898.
Patented May 3, 1921.
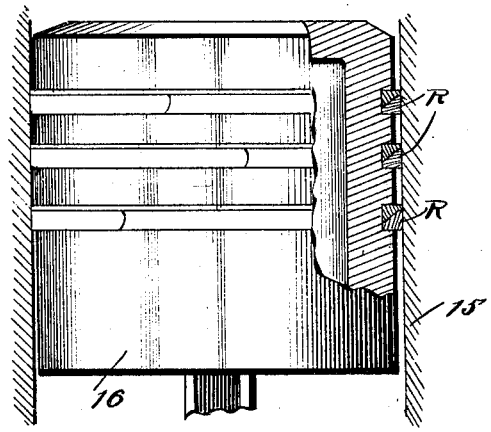
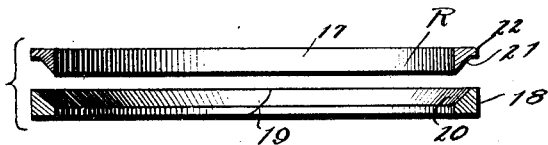
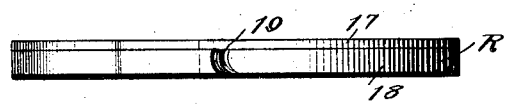
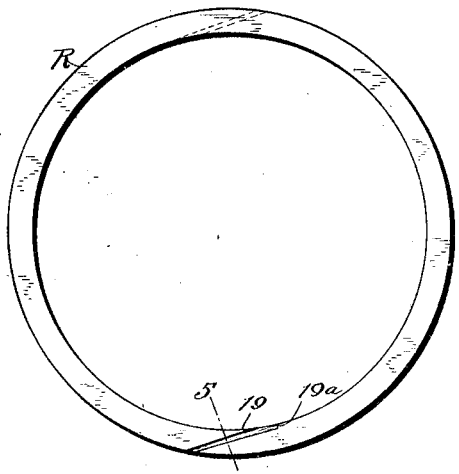
WITNESSES
INVENTORS
JOHN O'NEAL,
JOHN F. HAEPPNER
BY
ATTORNEYS

UNITED STATES PATENT OFFICE.

JOHN O'NEAL, OF ST. LOUIS, MISSOURI, AND JOHN F. HAEPPNER, OF EAST ST. LOUIS, ILLINOIS.

PISTON-RING.

1,376,898.   Specification of Letters Patent.   Patented May 3, 1921.

Application filed January 2, 1920. Serial No. 348,766.

*To all whom it may concern:*

Be it known that we, JOHN O'NEAL, a citizen of the United States, and a resident of the city of St. Louis, in the State of Missouri, and JOHN F. HAEPPNER, a citizen of the United States, and a resident of East St. Louis, in the county of St. Clair and State of Illinois, have invented certain new and useful Improvements in Piston-Rings, of which the following is a specification.

Our invention relates to piston rings particularly adapted, although not necessarily, to pistons for internal combustion engines.

A purpose of our invention is the provision of a piston ring comprised of two rings associated with each other in such manner that when in applied position upon a piston, one of the rings is actuated by the pressure of gas to expand the other ring into snug engagement with the walls of the cylinder and to thus effectively prevent leakage around the piston.

It is also a purpose of our invention to provide a piston ring of the above described character in which one of the rings is formed with an annular shoulder that causes the ring when working within a cylinder to be constantly moved within the other ring and to thus prevent the accumulation of carbon on the rings.

A further purpose of our invention is the provision of a piston ring having cuts of a contour that effect the self centering of the ring and the prevention of lateral movement of the ring ends.

We will describe one form of piston ring embodying our invention and will then point out the novel features thereof in claims.

In the accompanying drawings:—

Figure 1 is a view, showing a portion of a cylinder and a piston, the latter having applied thereto one form of piston ring embodying our invention;

Fig. 2 is a view, showing the two rings comprised in the piston in section and disassembled;

Fig. 3 is a view, showing in side elevation the piston ring shown in the preceding views;

Fig. 4 is a plan view of Fig. 3; and

Fig. 5 is a transverse sectional view, taken on the line 5—5 of Fig. 4.

Similar reference characters refer to similar parts in each of the several views.

Referring specifically to the drawings and particularly to Fig. 1, 15 designates a cylinder in which is mounted a piston 16, the latter being of conventional form and having mounted within the groove thereof piston rings designated generally at R. As shown in Figs. 2 and 3, each piston ring R comprises an upper ring 17 and a lower ring 18, each of which is formed of resilient metal and split at an angle of substantially 90° with respect to a horizontal line that intersects the axis of the ring. The split for the lower ring 18 is indicated at 19 in Fig. 4, while the split for the upper ring is indicated at $17^a$ in Fig. 5. As illustrated to advantage in Fig. 5, the split $17^a$ as well as the split 19 is made in the form of an arc so that one end of the ring is concave while the other end is convex. As shown in Fig. 4, the ring 17 is formed with a shoulder $19^a$ at the point where the split 19 merges into the inner periphery of the ring. This shoulder $19^a$ is for the purpose of restricting the inward movement of the outer end of the ring and to thereby prevent overlapping of the two ends.

As shown in Fig. 2, the lower ring 18 is provided on its inner side with an oblique face 20 which in effect forms a seat of frusto-conical contour. It is to be particularly noted that the upper edge of the oblique face 20 is spaced from the periphery of the ring to provide an annular ledge $20^a$. The upper ring 17 is provided on its outer side with an oblique face 21 and above such face is an annular shoulder 22 which is disposed in the plane of the ring. In the assembled position of the rings 17 and 18, the face 21 engages the face 20 with the shoulder 22 abutting the ledge $20^a$ of the ring 18. The split portions 19 and $17^a$ are positioned out of registry with each other and preferably 180° apart, as shown in Fig. 4.

In the applied position of the ring R upon the piston 16, the shoulder 22 of the upper ring 17 contacts with the walls of the cylinder 15. The outer periphery of the ring 18 also contacts with the walls of the cylinder while the oblique surfaces 20 and 21 contact with each other, as clearly shown in Fig. 1. In actual practice, the shoulder 22 being exposed to the explosive end of the cylinder is subjected to the pressure of gas within the cylinder. Under its action the ring 17 is forced downwardly against the ring 18 and because of the oblique surfaces 20 and 21, the ring 18 is expanded and thus forced into snug engagement with the walls of the cylinder. It is to be understood that this condition only occurs during the depression stroke of the piston, and during the exhaust stroke outward pressure upon the lower ring 18 is removed. This allows a slight film of oil to be carried upwardly between the ring and cylinder wall so as to lubricate the latter.

As the shoulder 22 is intermittently subjected to the gas within the cylinder it is obvious that constant movement of the ring 17 downwardly with respect to the ring 18 is effected so that the piston ring as a whole is said to be constantly alive. This results in the prevention of the accumulation of carbon around the ring.

By virtue of the arcuate splints 19 and 17ª, lateral movement of the ring ends is prevented by the coaction of the concave and convex surfaces. As previously described, the shoulder 19ª prevents overlapping of the ring ends so that the circular contour of the ring is at all times insured.

Although we have herein shown and described only one form of piston ring embodying our invention, it is to be understood that various changes and modifications may be resorted to without departing from the spirit of the invention and the spirit and scope of the appended claims.

Having thus described our invention, what we claim is:—

1. A piston ring comprising, two concentric split rings having meeting faces disposed at oblique angles, each of said rings having tapered ends with the confronting side of one of the ends concaved and the confronting side of the other end convexed.

2. A piston ring comprising, a pair of obliquely split rings with the confronting face of one end of each ring being formed with a convex surface and the confronting face of the other end with a concaved surface, and shoulders formed on the extreme ends of these rings to prevent overlapping of the ends.

3. A piston ring comprising, an upper ring obliquely split and provided with an annular shoulder on the outer periphery thereof and an inwardly inclined surface below said shoulder, a lower ring obliquely split and having an inner inwardly inclined surface against which the inclined surface of the upper ring is adapted to bear, each of said rings having tapered ends with the confronting side of one of the ends concaved and the confronting side of the other end convexed, and shoulders formed on the extreme ends of the rings to prevent overlapping of the ends.

JOHN O'NEAL.
JOHN F. HAEPPNER.